United States Patent
Wang et al.

(10) Patent No.: US 12,240,334 B2
(45) Date of Patent: Mar. 4, 2025

(54) VEHICLE CONTROL METHOD AND VEHICLE DRIVE SYSTEM

(71) Applicant: Shanghai XPT Technology Limited, Shanghai (CN)

(72) Inventors: Kai Wang, Hefei (CN); Wencheng Hong, Hefei (CN)

(73) Assignee: Shanghai XPT Technology Limited, Shanghai (CN)

( * ) Notice: Subject to any disclaimer, the term of this patent is extended or adjusted under 35 U.S.C. 154(b) by 379 days.

(21) Appl. No.: 17/689,225

(22) Filed: Mar. 8, 2022

(65) Prior Publication Data
US 2022/0289033 A1    Sep. 15, 2022

(30) Foreign Application Priority Data

Mar. 9, 2021   (CN) .......................... 202110257052.7
Mar. 9, 2021   (CN) .......................... 202110258143.2

(51) Int. Cl.
*B60L 3/00*     (2019.01)
*B60L 50/52*    (2019.01)
*H02P 6/10*     (2006.01)

(52) U.S. Cl.
CPC ............ *B60L 3/0061* (2013.01); *B60L 3/003* (2013.01); *B60L 3/0084* (2013.01); *B60L 50/52* (2019.02); *H02P 6/10* (2013.01); *B60L 2210/10* (2013.01); *B60L 2240/423* (2013.01)

(58) Field of Classification Search
CPC ........ B60L 3/0061; B60L 3/003; B60L 50/52; B60L 2210/10; B60L 2240/423; B60L 53/24; B60L 58/18; H02P 6/10; H02P 25/098; H02M 1/14
See application file for complete search history.

(56) References Cited

U.S. PATENT DOCUMENTS

| | | | | |
|---|---|---|---|---|
| 2006/0067655 A1* | 3/2006 | Okuda | ............. | H02M 7/53873 388/805 |
| 2010/0071970 A1* | 3/2010 | Welchko | .................. | H02P 5/74 318/400.26 |
| 2011/0316461 A1* | 12/2011 | Rippel | ..................... | H02P 6/14 318/400.29 |

(Continued)

FOREIGN PATENT DOCUMENTS

| CN | 106849305 A | * | 6/2017 |
| JP | 2021069213 A | * | 4/2021 |

*Primary Examiner* — Bickey Dhakal
(74) *Attorney, Agent, or Firm* — Sheridan Ross P.C.

(57) ABSTRACT

The present invention provides a vehicle control method for controlling a capacitance ripple and a torque ripple of a vehicle drive system, wherein the vehicle drive system comprises a first DC-DC convertor. The vehicle control method comprises utilizing a first three-phase inverter circuit of a motor control device of the vehicle drive system as a first switching circuit of the first DC-DC convertor; utilizing a first three-phase winding of a motor of the vehicle drive system as a first three-phase inductor of the first DC-DC convertor; utilizing a pulse width modulation controller of the vehicle drive system for modulating a first three-phase current outputted by the first switching circuit to generate a first three-phase carrier wave; and setting a first phase difference of each phase of the first three-phase carrier wave for controlling the capacitance ripple and the torque ripple.

16 Claims, 6 Drawing Sheets

(56) References Cited

U.S. PATENT DOCUMENTS

| | | | |
|---|---|---|---|
| 2013/0264872 A1* | 10/2013 | Tago | H02M 7/003 307/31 |
| 2018/0251036 A1* | 9/2018 | Tapadia | H02P 5/74 |
| 2018/0269771 A1* | 9/2018 | Mori | H02M 7/53873 |
| 2023/0155533 A1* | 5/2023 | Hoshino | H02M 7/5395 318/801 |

* cited by examiner (3A)

(3B)

VEHICLE CONTROL METHOD AND VEHICLE DRIVE SYSTEM

CROSS-REFERENCE TO RELATED APPLICATION

This application claims the benefit of China Patent Application No. 202110258143.2 filed Mar. 9, 2021 and China Patent Application No. 202110257052.7 filed Mar. 9, 2021, the entire contents of each of which are incorporated herein by reference in their entireties.

FIELD OF THE INVENTION

The present invention relates to a vehicle control method and a vehicle drive system, and in particular to a vehicle control method and a vehicle drive system for effectively controlling a capacitance ripple and a torque ripple during the operation of a DC-DC converter.

DESCRIPTION OF THE PRIOR ART

The rapid rise of the electric vehicle industry in recent years has brought huge challenges to the design of power management chips. The conventional technology uses the center tap of the three-phase winding of the motor as one terminal, which is connected to an external power supply. However, the conventional technology has two problems. First, the DC capacitor ripple is too large due to the inductance being too small, which results in too much reactive power loss, reduced capacitor life and reduced system reliability. On the other hand, the torque ripple of the motor is generated during the operation of the DC-DC convention, which leads to greater vibration and noise when the vehicle is charged.

SUMMARY OF THE INVENTION

The present invention provides a vehicle control method and a vehicle drive system to solve the above-mentioned problems.

The present invention provides a vehicle control method for controlling a capacitance ripple and a torque ripple of a vehicle drive system, wherein the vehicle drive system comprises a first DC-DC convertor. The vehicle control method comprises utilizing a first three-phase inverter circuit of a motor control device of the vehicle drive system as a first switching circuit of the first DC-DC convertor; utilizing a first three-phase winding of a motor of the vehicle drive system as a first three-phase inductor of the first DC-DC convertor; utilizing a pulse width modulation controller of the vehicle drive system for modulating a first three-phase current outputted by the first switching circuit to generate a first three-phase carrier wave; and setting a first phase difference of each phase of the first three-phase carrier wave for controlling the capacitance ripple and the torque ripple.

The present invention provides a vehicle drive system, utilized as a first DC-DC converter, comprising a motor, comprising a first three-phase winding, wherein the first three-phase winding is utilized as a first three-phase inductor of the first DC-DC convertor; and a motor control device, comprising a first three-phase inverter circuit, a pulse width modulation controller and a processing circuit, wherein the first three-phase inverter circuit is utilized as a first switching circuit of the first DC-DC converter, the pulse width modulation controller is utilized for modulating a first three-phase current outputted by the first switching circuit to generate a first three-phase carrier wave, and the processing circuit sets a first phase difference of each phase of the first three-phase carrier wave for controlling a capacitance ripple and a torque ripple.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
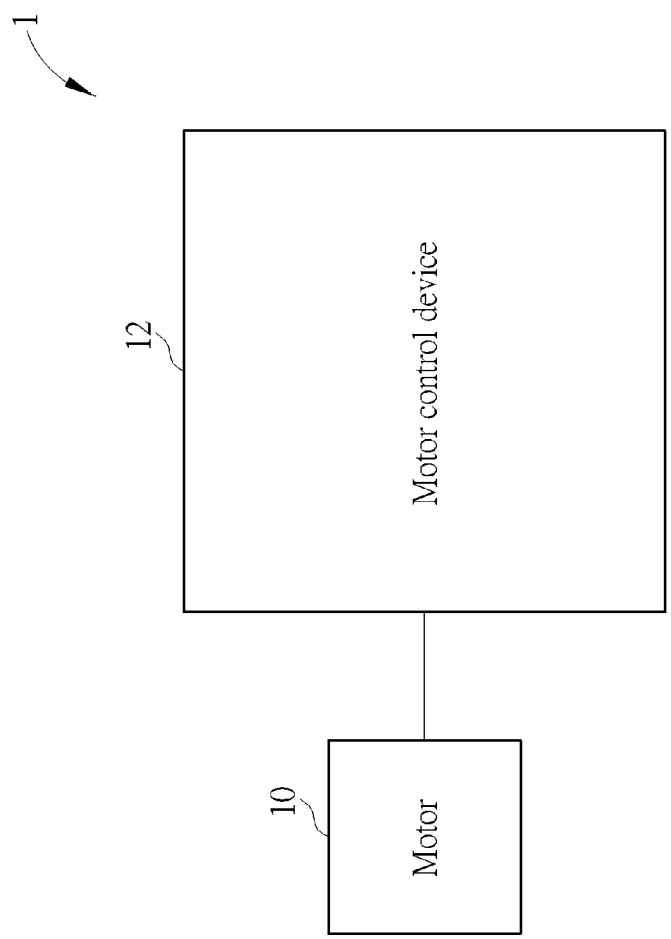
FIG. 1 is a schematic diagram illustrating a vehicle drive system according to an embodiment of the present invention.

Please refer to FIG. 1. FIG. 1 is a schematic diagram illustrating a vehicle drive system 1 according to an embodiment of the present invention. The vehicle drive system 1 includes a motor 10 and a motor control device 12. The motor control device 12 may generate a control signal for controlling the motor 10 to drive a vehicle.

Figure 2:
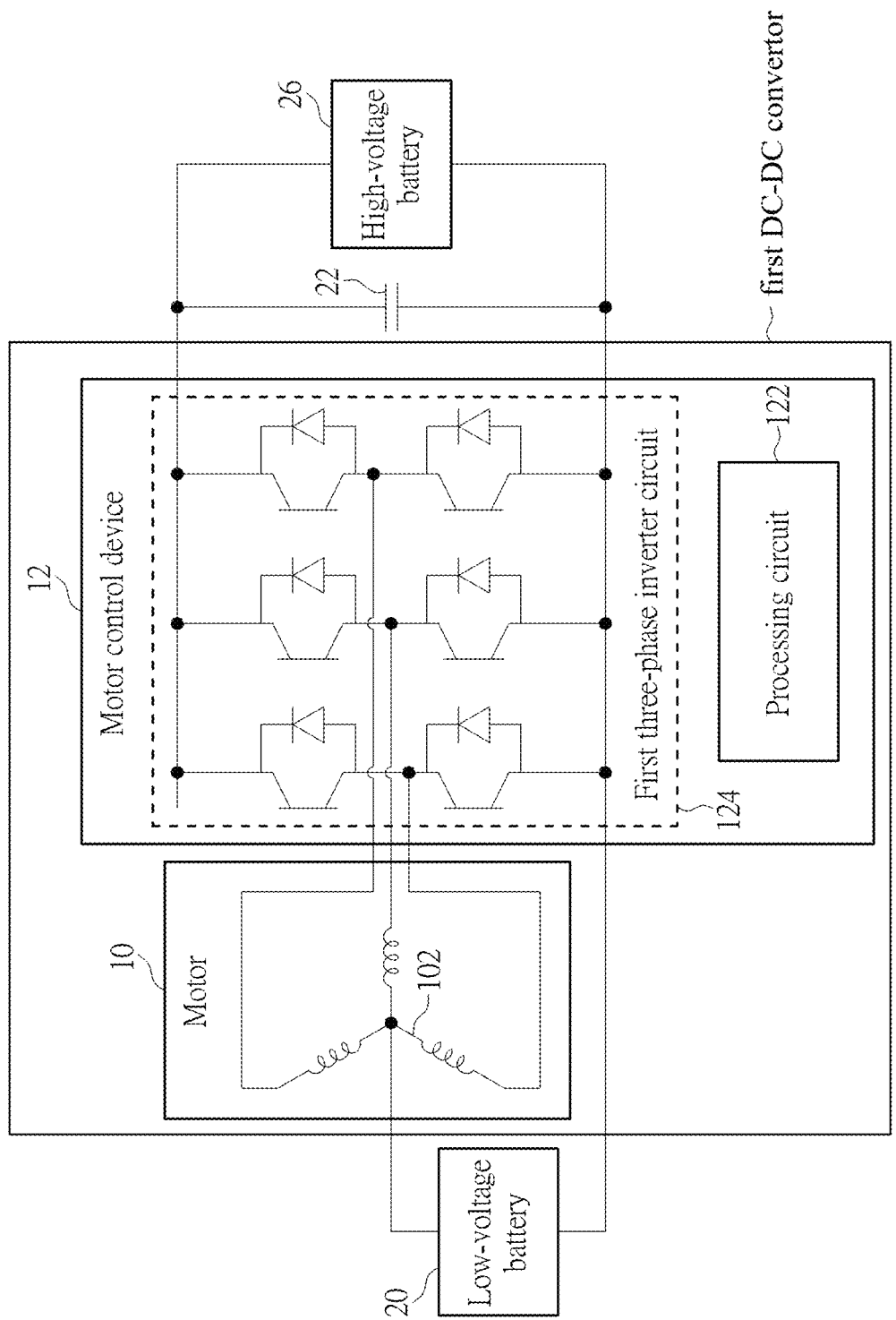
FIG. 2 is a schematic diagram of using a vehicle drive system as a DC-DC converter according to an embodiment of the present invention.

Please refer to FIG. 2. FIG. 2 is a schematic diagram of using the vehicle drive system 1 as a DC-DC converter according to an embodiment of the present invention. The motor 10 includes a first three-phase winding 102, wherein the first three-phase winding 102 may be a star-connected stator winding with a center tap. The motor control device 12 includes a processing circuit 122 and a first three-phase inverter circuit 124. The first three-phase inverter circuit 124 generates a first three-phase current. The processing circuit 122 utilizes a pulse width modulation controller for modulating the first three-phase current to generate a first three-phase carrier wave, which may control the first three-phase winding 102 of the motor 10 to drive the vehicle.

In an embodiment, please refer to FIG. 2. The processing circuit 122 is utilized for controlling the vehicle drive system 1 as a first DC-DC convertor, using the first three-phase inverter circuit 124 of the motor control device 12 as a first switching circuit of the first DC-DC convertor, and using the first three-phase winding 102 of the motor 10 as a first three-phase inductor of the first DC-DC convertor. A low-voltage battery 20 is coupled to the center tap of the first three-phase winding 102, and a first DC link capacitor 22 and a high-voltage battery 26 are coupled to the first three-phase inverter circuit 124. Accordingly, the first DC voltage boost converter (boost circuit) from the low-voltage battery 20 to the high-voltage battery 26 may be achieved, and the first DC voltage buck converter (buck circuit) from the high-voltage battery 26 to the low-voltage battery 20 may also be achieved. Thus, the electric energy may be transmitted in both directions. It should be noted that the vehicle drive system 1 in FIG. 1 and FIG. 2 only represents the necessary components required by the vehicle drive system 1 of the present invention as the first DC-DC convertor, and the basic structure thereof is well known in the art, and will not be narrated for brevity.

Figure 3:
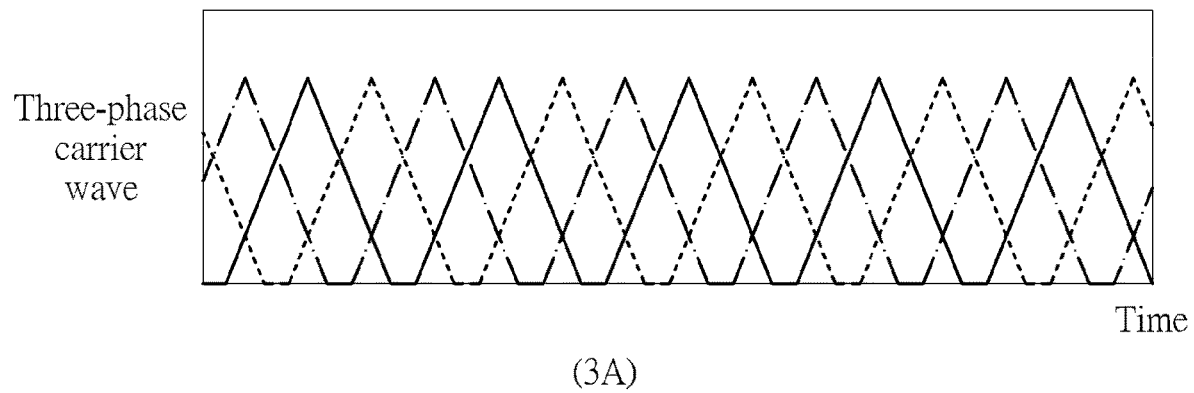
FIG. 3 is a diagram of the three-phase carrier wave and the inductance ripple current according to an embodiment of the present invention.
Figure 3:
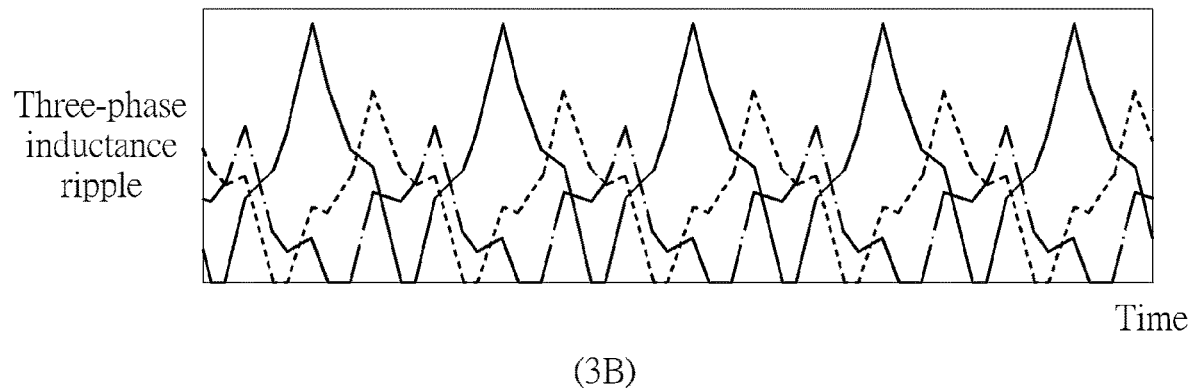

Please refer to FIG. 3. FIG. 3 is a diagram of the three-phase carrier wave and the inductance ripple current according to an embodiment of the present invention. In the normal control mode of the first three-phase carrier wave, the phase of each phase of the first three-phase carrier wave will remain the same. At this time, the phase of the three-phase inductance ripple will also remain the same. Since the capacitance ripple is equal to the sum of the three-phase inductance ripple, the capacitor ripple is equal to three times the magnitude of the three-phase inductance ripple. Accordingly, the processing circuit 122 controls the three-phase carrier wave to shift the phase, so that the phase of the three-phase inductance ripple is also shifted. For example, as shown in FIG. 3A, the processing circuit 122 sets a phase difference between each phase of the three-phase carrier wave in the first three-phase carrier wave to 120 degrees. Therefore, as shown in FIG. 3B, the phase of the three-phase inductance ripple is also shifted by 120 degrees, so that the sum of the three-phase inductance ripple is reduced; that is, the magnitude of the capacitor ripple is also reduced.

Figure 4:
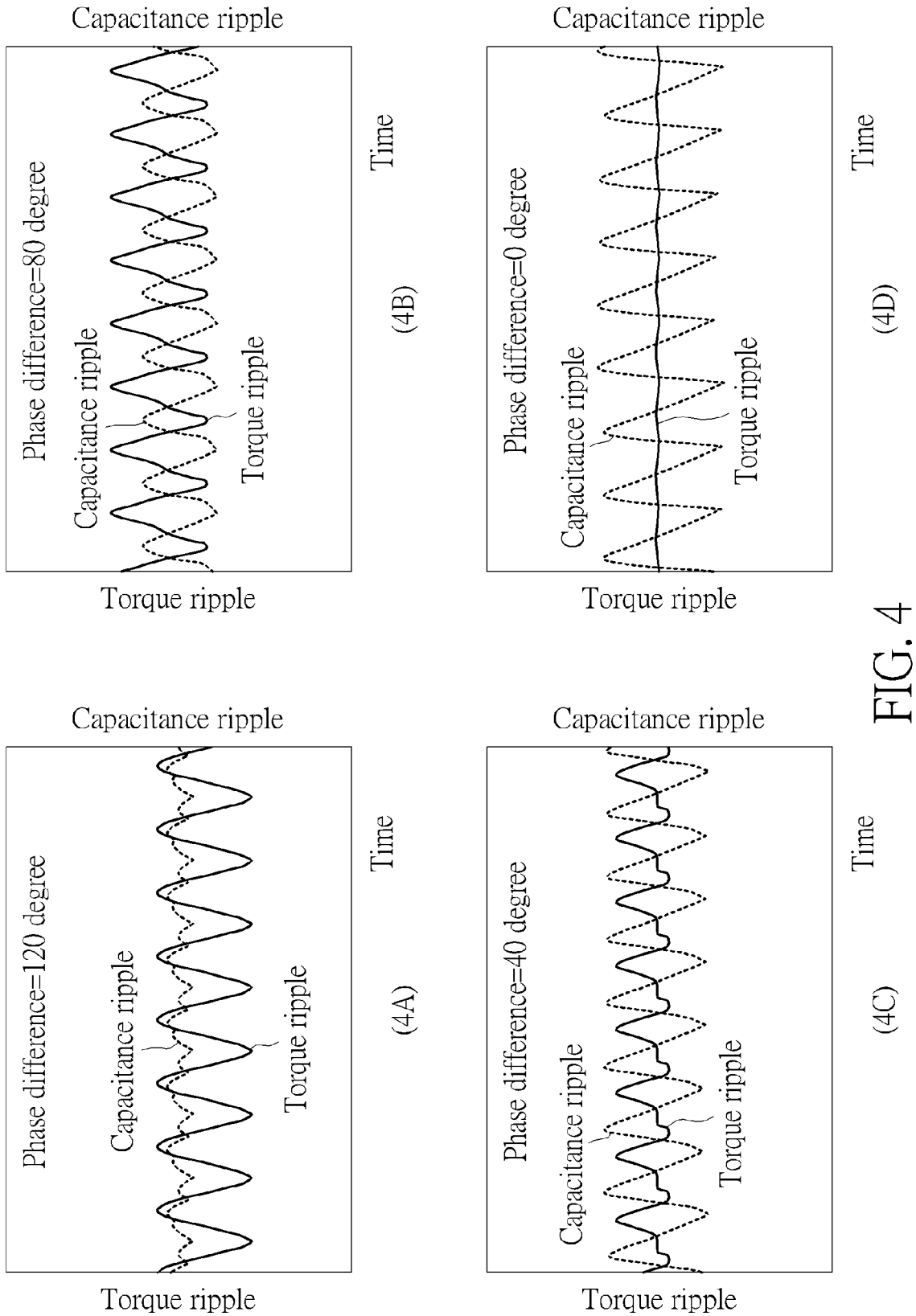
FIG. 4 is a diagram of the capacitance ripple and the torque ripple according to an embodiment of the present invention.

Please refer to FIG. 4. FIG. 4 is a diagram of the capacitance ripple and the torque ripple according to an embodiment of the present invention. FIG. 4A-4D are diagrams of the capacitance ripple and the torque ripple when the phase difference between each phase of the three-phase carrier wave in the first three-phase carrier wave is set to a different degree. As shown in FIG. 4A-4D, for example, by comparing the magnitude of the capacitor ripple at different phase differences, when the processing circuit 122 sets the phase difference between each phase of the three-phase carrier wave in the first three-phase carrier wave to 120 degrees, the magnitude of the capacitance ripple is the smallest; when the processing circuit 122 sets the phase difference of the three-phase carrier wave in the first three-phase carrier wave to 0 degrees, the magnitude of the capacitance ripple is the largest. For example, by comparing the magnitude of the torque ripple, when the processing circuit 122 sets the phase difference of each phase of the three-phase carrier wave in the first three-phase carrier wave to 120 degrees, the magnitude of the torque ripple is the largest; when the processing circuit 122 sets the phase difference of each phase of the three-phase carrier wave in the first three-phase carrier wave to 0 degrees, the magnitude of the torque ripple is the smallest.

In an embodiment, referring to FIG. 4, the processing circuit 122 sets the phase difference of each phase of the first three-phase carrier wave according to a system requirement to control the capacitance ripple and the torque ripple. For example, when the system requirement is to control the vehicle to reduce the vibration and noise generated when the vehicle is charged, the processing circuit 122 may set the phase difference of each phase of the first three-phase carrier wave to 0 degrees or 40 degrees (as shown in FIG. 4C and FIG. 4D) to reduce the torque ripple, so as to reduce the vibration and noise generated when the vehicle is being charged. For example, when the system requirement is to reduce reactive power loss to avoid the decrease of capacitor life and the decrease of system reliability, the processing circuit 122 may set the phase difference of each phase of the first three-phase carrier wave to 120 degrees or 80 degrees (as shown in FIG. 4A and FIG. 4B) to reduce the capacitance ripple, so as to reduce the reactive power loss, and avoid the decrease of capacitor life and the decrease of system reliability.

Figure 5:
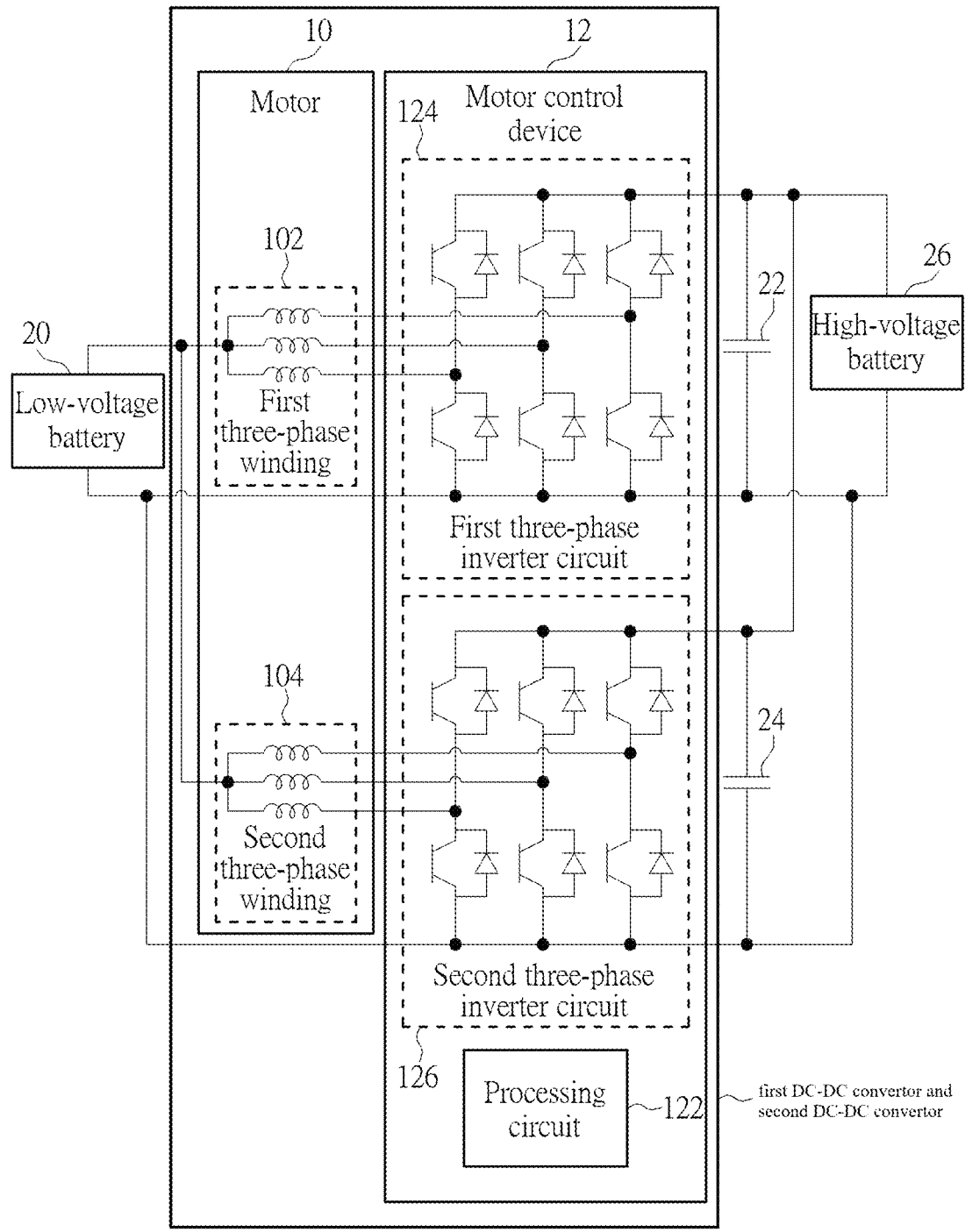
FIG. 5 is a schematic diagram illustrating a vehicle drive system according to an embodiment of the present invention.

Please refer to FIG. 5. FIG. 5 is a schematic diagram illustrating the vehicle drive system 1 according to an embodiment of the present invention. The motor 10 may be a double-winding motor. The motor 10 includes a first three-phase winding 102 and a second three-phase winding 104. The first three-phase winding 102 and the second three-phase winding 104 may be a star-connected stator winding with a center tap. The motor control device 12 includes the processing circuit 122, the first three-phase inverter circuit 124 and a second three-phase inverter circuit 126. The first three-phase inverter circuit 124 generates the first three-phase current, and the second three-phase inverter circuit 126 generates a second three-phase current. The processing circuit 122 utilizes the pulse width modulation controller for modulating the first three-phase current and the second three-phase current to generate the first three-phase carrier wave and a second three-phase carrier wave, which controls the first three-phase winding 102 and the second three-phase winding 104 of the motor 10 to drive the vehicle.

In an embodiment, please refer to FIG. 5. The processing circuit 122 is utilized for controlling the vehicle drive system 1 as the first DC-DC convertor and a second DC-DC convertor. Specifically, the processing circuit 122 utilizes the first three-phase inverter circuit 124 of the motor control device 12 as the first switching circuit of the first DC-DC convertor, and the first three-phase winding 102 of the motor 10 as the first three-phase inductor of the first DC-DC convertor. On the other hand, the processing circuit 122 utilizes the second three-phase inverter circuit 126 of the motor control device 12 as a second switching circuit of the second DC-DC convertor, and the second three-phase winding 104 of the motor 10 as a second three-phase inductor of the second DC-DC convertor. In addition, in the present invention, the low-voltage battery 20 is coupled to the center tap of the first three-phase winding 102 and the second three-phase winding 104, the DC link capacitor 22 and the high-voltage battery 26 are coupled to the first three-phase inverter circuit 124, and the DC link capacitor 24 and the high-voltage battery 26 are coupled to the second three-phase inverter circuit 126. Accordingly, the first DC voltage boost converter (boost circuit) from the low-voltage battery 20 to the high-voltage battery 26 may be realized, and the first DC voltage buck converter (buck circuit) from the high-voltage battery 26 to the low-voltage battery 20 may also be realized. Thus, the electric energy may be transmitted in both directions. It should be noted that the vehicle drive system 1 in FIG. 1 and FIG. 5 only represents the necessary components required by the vehicle drive system 1 of the present invention as the first DC-DC convertor, and the basic structure thereof is well known in the art, and will not be narrated for brevity.

Figure 6:
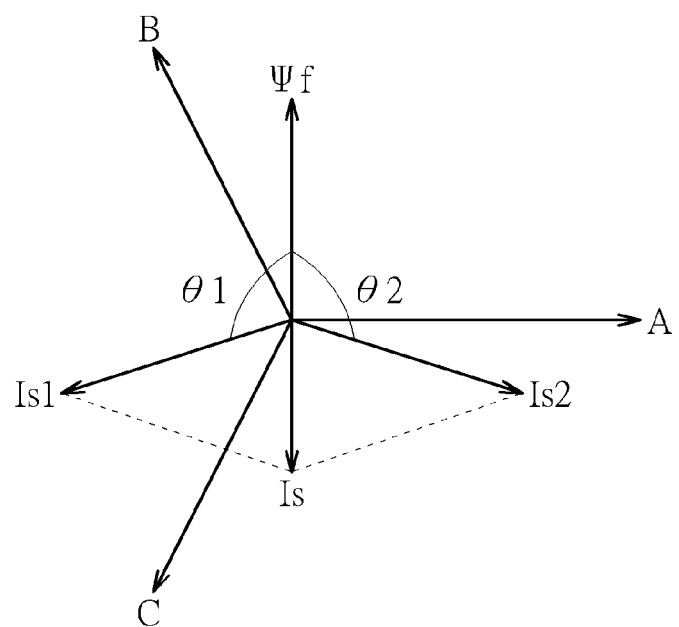
FIG. 6 is a diagram of the first composite carrier wave, the second composite carrier wave and the rotor permanent magnetic field on the three-phase stationary coordinate according to an embodiment of the present invention.

Please refer to FIG. 6. FIG. 6 is a schematic diagram of a first composite carrier wave Is1, a second composite carrier wave Is2 and a rotor permanent magnetic field Ψf on the three-phase stationary coordinate (A, B, C) according to an embodiment of the present invention. As shown in FIG. 6, the first composite carrier wave Is1 of the first three-phase carrier wave generated by the first DC-DC convertor is toward a first direction at the three-phase stationary coordinate, and the second composite carrier wave Is2 of the second three-phase carrier wave generated by the second DC-DC convertor is toward a second direction at the three-phase stationary coordinate. The torque ripple of the vehicle drive system 1 is related to the rotor permanent magnetic field Ψf and a dot product of the first composite carrier wave Is1 and the second composite carrier wave Is2. Accordingly, the processing circuit 122 sets the first composite carrier wave Is1 to be toward the first direction at the three-phase stationary coordinate and the second composite carrier wave to be toward the second direction in the three-phase stationary coordinate to control the torque ripple of the vehicle drive system 1. For example, as shown in FIG. 6, the angle between the first direction and a rotor permanent magnetic field direction of the rotor permanent magnetic field Ψf is a first angle θ1, and the angle between the second direction and the rotor permanent magnetic field direction is a second angle θ2. The processing circuit 122 sets the angle value of the first angle and second angle to be the same, the angle direction of the first angle and second angle to be opposite, and the magnitude of the first composite carrier wave Is1 and the second composite carrier wave Is2 to be the same. At this time, a third composite carrier wave Is of the first composite carrier wave Is1 and the second composite carrier wave Is2 is facing a third direction at the three-phase stationary coordinate, and the third direction will be parallel to the rotor permanent magnetic field direction. In other words, the angle between the third direction and the rotor permanent magnetic field direction is 0 degrees or 180 degrees, and the torque ripple of the vehicle drive system 1 is related to the dot product of the rotor permanent magnetic field Ψf and the third composite carrier wave Is. Thus, the torque ripple of the vehicle drive system 1 is 0, and the purpose of reducing the torque ripple is achieved.

Figure 7:
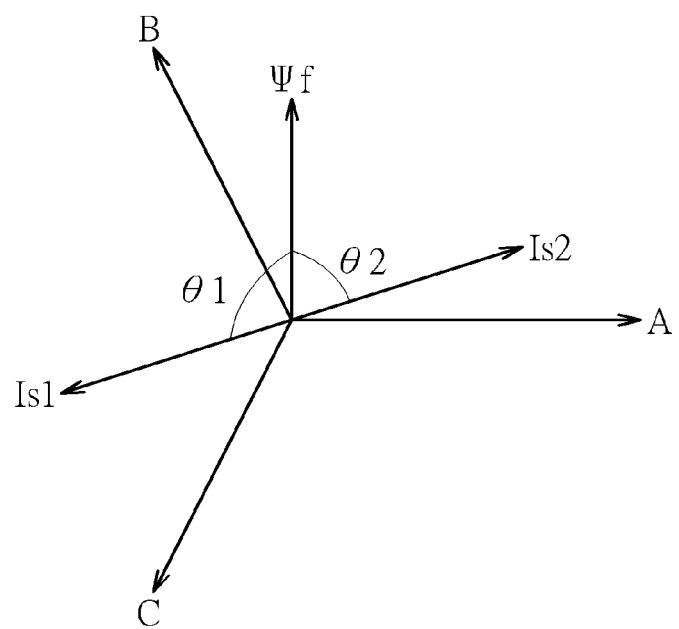
FIG. 7 is a diagram of the first composite carrier wave, the second composite carrier wave and the rotor permanent magnetic field on the three-phase stationary coordinate according to another embodiment of the present invention.

Please refer to FIG. 7. FIG. 7 is a schematic diagram of the first composite carrier wave Is1, the second composite carrier wave Is2 and the rotor permanent magnetic field Ψf on the three-phase stationary coordinate (A, B, C) according to another embodiment of the present invention. The processing circuit 122 sets the first composite carrier wave Is1 to be toward the first direction at the three-phase stationary coordinate and the second composite carrier wave Is2 to be toward the second direction at the three-phase stationary coordinate to control the torque ripple of the vehicle drive system 1. For example, as shown in FIG. 7, the processing circuit 122 sets the sum of the first angle and the second angle to be equal to 180 degrees; that is, the phase difference between the first direction and the second direction is 180 degrees. Therefore, the magnitude of the third composite carrier wave Is is the magnitude of the first composite carrier wave Is1 minus the magnitude of the second composite carrier wave Is2. When the processing circuit 122 sets the magnitude of the first composite carrier wave Is1 to be equal to the magnitude of the second composite carrier wave Is2, the magnitude of the third composite carrier wave Is is equal to 0, and the torque ripple of the vehicle drive system 1 is related to the dot product of the rotor permanent magnetic field Ψf and the third composite carrier wave Is. Thus, the torque ripple of the vehicle drive system 1 is 0, and the purpose of reducing the torque ripple is achieved.

In an embodiment, the processing circuit 122 sets the phase difference of each phase of the first three-phase carrier wave to be 120 degrees and sets the phase difference of each phase of the second three-phase carrier wave to be 120 degrees, so that the capacitance ripple of the vehicle drive system 1 is reduced. Thereby, the reactive power loss is reduced to avoid the decrease of capacitor life and the decrease of system reliability.

Those skilled in the art should readily make combinations, modifications and/or alterations to the abovementioned description and examples. The abovementioned description, steps, processes, procedures and/or processes including suggested steps may be realized by means that could be hardware, software, firmware (known as a combination of a hardware device and computer instructions and data that reside as read-only software on the hardware device), an electronic system, or combination thereof. Examples of hardware may include analog, digital and mixed circuits known as microcircuit, microchip, or silicon chip. Examples of the electronic system may include a system on chip (SoC), system in package (SiP), a computer on module (CoM) and the vehicle drive system 1. Any of the abovementioned processes, procedures and examples above may be compiled into program codes or instructions that are stored in a computer-readable storage medium. The computer-readable storage medium may include read-only memory (ROM), flash memory, random access memory (RAM), subscriber identity module (SIM), hard disk, floppy diskette, or CD-ROM/DVD-ROM/BD-ROM, but not limited thereto. The processor may read and execute the program codes or the instructions stored in the computer-readable storage medium for realizing the abovementioned functions.

In summary, the vehicle control method of the present invention utilizes a first three-phase inverter circuit 124 of a motor control device 12 of the vehicle drive system 1 as a first switching circuit of the first DC-DC convertor; utilizes a first three-phase winding of a motor of the vehicle drive system as a first three-phase inductor of the first DC-DC convertor; utilizes a pulse width modulation controller of the vehicle drive system for modulating a first three-phase current outputted by the first switching circuit to generate a first three-phase carrier wave; and sets a first phase difference of each phase of the first three-phase carrier wave for controlling the capacitance ripple and the torque ripple.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A vehicle control method for controlling a capacitance ripple and a torque ripple of a vehicle drive system, wherein the vehicle drive system comprises a first DC-DC convertor and a second DC-DC convertor, the vehicle control method comprising:

utilizing a first three-phase inverter circuit of a motor control device of the vehicle drive system as a first switching circuit of the first DC-DC convertor;
utilizing a first three-phase winding of a motor of the vehicle drive system as a first three-phase inductor of the first DC-DC convertor;
utilizing a pulse width modulation controller of the vehicle drive system for modulating a first three-phase current outputted by the first switching circuit to generate a first three-phase carrier wave;
utilizing a second three-phase inverter circuit of the motor control device of the vehicle drive system as a second switching circuit of the second DC-DC convertor;
utilizing a second three-phase winding of the motor of the vehicle drive system as a second three-phase inductor of the second DC-DC convertor;
utilizing the pulse width modulation controller of the vehicle drive system for modulating a second three-phase current outputted by the second switching circuit to generate a second three-phase carrier wave; and
setting a first composite carrier wave of the first three-phase carrier wave to be toward a first direction in a three-phase stationary coordinate and a second composite carrier wave of the second three-phase carrier wave to be toward a second direction in the three-phase stationary coordinate for controlling the torque ripple of the vehicle drive system.

2. The vehicle control method of claim 1, further comprising setting a first phase difference of each phase of the first three-phase carrier wave according to a system requirement for controlling the capacitance ripple and the torque ripple.

3. The vehicle control method of claim 2, wherein the capacitance ripple is the largest and the torque ripple is the smallest when the first phase difference is 120 degrees, and the capacitance ripple is the smallest and the torque ripple is the largest when the first phase difference is 0 degrees.

4. The vehicle control method of claim 1, further comprising:
setting the first direction and a rotor permanent magnetic field direction of a rotor in the three-phase stationary coordinate to be a first angle and setting the second direction and the rotor permanent magnetic field direction to be a second angle for controlling the torque ripple of the vehicle drive system.

5. The vehicle control method of claim 4, wherein the torque ripple is smallest when an angle value of the first angle and an angle value of the second angle are the same and an angle direction of the first angle and an angle direction of the second angle are opposite.

6. The vehicle control method of claim 1, further comprising:
setting a phase difference between the first and the second direction as 180 degrees for controlling the torque ripple of the vehicle drive system.

7. The vehicle control method of claim 6, wherein the torque ripple is smallest when a magnitude of the first composite carrier wave is equal to a magnitude of the second composite carrier wave.

8. The vehicle control method of claim 1, wherein the capacitance ripple is smallest when a first phase difference of each phase of the first three-phase carrier wave and a second phase difference of each phase of the second three-phase carrier wave are 120 degrees.

9. A vehicle drive system, utilized as a first DC-DC convertor and a second DC-DC convertor, comprising:
a motor, comprising:
  a first three-phase winding, wherein the first three-phase winding is utilized as a first three-phase inductor of the first DC-DC convertor; and
  a second three-phase winding, the second three-phase winding is utilized as a second three-phase inductor of the second DC-DC convertor; and
a motor control device, comprising a first three-phase inverter circuit, a second three-phase inverter circuit, a pulse width modulation controller and a processing circuit, wherein
  the first three-phase inverter circuit is utilized as a first switching circuit of the first DC-DC convertor,
  the second three-phase inverter circuit is utilized as a second switching circuit of the second DC-DC convertor,
  the pulse width modulation controller is utilized for modulating a first three-phase current outputted by the first switching circuit to generate a first three-phase carrier wave, and modulating a second three-phase current outputted by the second switching circuit to generate a second three-phase carrier wave, and
  the processing circuit sets a first composite carrier wave of the first three-phase carrier wave to be toward a first direction in a three-phase stationary coordinate and a second composite carrier wave of the second three-phase carrier wave to be toward a second direction in the three-phase stationary coordinate for controlling the torque ripple of the vehicle drive system.

10. The vehicle drive system of claim 9, wherein the processing circuit sets a first phase difference of each phase of the first three-phase carrier wave according to a system requirement for controlling the capacitance ripple and the torque ripple.

11. The vehicle control method of claim 10, wherein the capacitance ripple is the largest and the torque ripple is the smallest when the first phase difference is 120 degrees, and the capacitance ripple is the smallest and the torque ripple is the largest when the first phase difference is 0 degrees.

12. The vehicle drive system of claim 9, wherein the processing circuit further sets the first direction and a rotor permanent magnetic field direction of a rotor in the three-phase stationary coordinate to be a first angle and sets the second direction and the rotor permanent magnetic field direction to be a second angle for controlling the torque ripple of the vehicle drive system.

13. The vehicle drive system of claim 12, wherein the torque ripple is smallest when an angle value of the first angle and an angle value of the second angle are the same and an angle direction of the first angle and an angle direction of the second angle are opposite.

14. The vehicle drive system of claim 9, wherein the processing circuit further sets a phase difference between the first and the second direction as 180 degrees for controlling the torque ripple of the vehicle drive system.

15. The vehicle drive system of claim 14, wherein the torque ripple is smallest when a magnitude of the first composite carrier wave is equal to a magnitude of the second composite carrier wave.

16. The vehicle control method of claim 9, wherein the capacitance ripple is smallest when a first phase difference of each phase of the first three-phase carrier wave and a second phase difference of each phase of the second three-phase carrier wave are 120 degrees.

* * * * *